(12) United States Patent
Dingwall et al.

(10) Patent No.: US 11,507,629 B2
(45) Date of Patent: Nov. 22, 2022

(54) DATASET NETWORKING AND DATABASE MODELING

(71) Applicant: PAREXEL International, LLC, Waltham, MA (US)

(72) Inventors: Nicholas Dingwall, Truro (GB); Kevin Reschke, Mountain View, CA (US)

(73) Assignee: PAREXEL International, LLC, Waltham, MA (US)

( * ) Notice: Subject to any disclaimer, the term of this patent is extended or adjusted under 35 U.S.C. 154(b) by 740 days.

(21) Appl. No.: 15/796,583

(22) Filed: Oct. 27, 2017

(65) Prior Publication Data

US 2018/0121546 A1 May 3, 2018
US 2018/0300409 A9 Oct. 18, 2018

Related U.S. Application Data

(60) Provisional application No. 62/414,568, filed on Oct. 28, 2016.

(51) Int. Cl.
*G06F 16/00* (2019.01)
*G06F 16/951* (2019.01)
*G06F 16/13* (2019.01)
*H04L 9/40* (2022.01)

(52) U.S. Cl.
CPC ............ *G06F 16/951* (2019.01); *G06F 16/13* (2019.01); *H04L 63/10* (2013.01)

(58) Field of Classification Search
CPC ........ G06F 16/13; G06F 16/951; G06F 16/23; G06F 16/2393; G06F 16/28; H04N 63/10; H04L 63/10; G06T 11/206

USPC ........................................................ 707/706
See application file for complete search history.

(56) References Cited

U.S. PATENT DOCUMENTS

| | | | |
|---|---|---|---|
| 5,450,535 A | 9/1995 | North | |
| 8,452,851 B2* | 5/2013 | Kabiljo | ................... G06F 16/95 709/218 |
| 8,996,555 B2 | 3/2015 | Kuchmann-Beauger et al. | |
| 2002/0059069 A1 | 5/2002 | Hsu et al. | |

(Continued)

OTHER PUBLICATIONS

International Search Report and Written Opinion in International Patent Application No. PCT/US2017/058859 dated Feb. 2, 2018, 14 pages.

(Continued)

*Primary Examiner* — Vincent F Boccio
(74) *Attorney, Agent, or Firm* — Wolf, Greenfield & Sacks, P.C.

(57) ABSTRACT

In various example embodiments, a system and methods are presented for generating node clusters from a plurality of disconnected nodes and generating data access models for interaction with the nodes. The system and methods identify one or more datasets associated with a first set of nodes distributed across a plurality of node clusters, and a set of entities associated within the plurality of node clusters. A node layer is generated based on the one or more datasets and the set of entities. One or more connections are generated between the first set of nodes and a set of coordinating nodes, and between the set of coordinating nodes and a second set of nodes. The systems and methods generate a result set distributed across the plurality of nodes based on connections between the set of coordinating nodes and the first set of nodes and the second set of nodes.

21 Claims, 7 Drawing Sheets

(56) References Cited

U.S. PATENT DOCUMENTS

| | | | |
|---|---|---|---|
| 2002/0107844 | A1 | 8/2002 | Cha et al. |
| 2003/0033277 | A1* | 2/2003 | Bahulkar .............. G06F 16/289 |
| 2003/0069908 | A1* | 4/2003 | Anthony .............. G06F 40/143 |
| | | | 715/251 |
| 2003/0149685 | A1 | 8/2003 | Trossman et al. |
| 2003/0212544 | A1 | 11/2003 | Acero et al. |
| 2005/0027664 | A1 | 2/2005 | Johnson et al. |
| 2005/0090911 | A1 | 4/2005 | Ingargiola et al. |
| 2005/0273730 | A1 | 12/2005 | Card et al. |
| 2006/0036568 | A1* | 2/2006 | Moore .................. G06F 16/168 |
| 2006/0248045 | A1 | 11/2006 | Toledano et al. |
| 2007/0106499 | A1 | 5/2007 | Dahlgren et al. |
| 2008/0172407 | A1* | 7/2008 | Sacks ..................... G06Q 10/10 |
| 2011/0252355 | A1 | 10/2011 | Nixon et al. |
| 2011/0264291 | A1 | 10/2011 | Le Roux et al. |
| 2012/0072468 | A1 | 3/2012 | Anthony et al. |
| 2013/0151572 | A1 | 6/2013 | Brocato et al. |
| 2013/0262449 | A1* | 10/2013 | Arroyo ............... G06F 16/3325 |
| | | | 707/722 |
| 2014/0059084 | A1 | 2/2014 | Adams et al. |
| 2014/0098101 | A1 | 4/2014 | Friedlander et al. |
| 2014/0244325 | A1 | 8/2014 | Cartwright |
| 2014/0258301 | A1 | 9/2014 | Misra et al. |
| 2014/0337306 | A1* | 11/2014 | Gramatica .......... G06F 16/2471 |
| | | | 707/706 |
| 2015/0117216 | A1* | 4/2015 | Anand .................. H04L 41/042 |
| | | | 370/236 |
| 2016/0162458 | A1 | 6/2016 | Munro et al. |
| 2016/0275196 | A1 | 9/2016 | Lee et al. |
| 2017/0270418 | A1 | 9/2017 | Reschke et al. |
| 2017/0277841 | A1 | 9/2017 | Shankar et al. |
| 2018/0075359 | A1 | 3/2018 | Brennan et al. |
| 2018/0121500 | A1 | 5/2018 | Rescchke et al. |
| 2019/0034591 | A1 | 1/2019 | Mossin et al. |
| 2020/0293712 | A1 | 9/2020 | Potts et al. |
| 2021/0191924 | A1 | 6/2021 | Reschke et al. |

OTHER PUBLICATIONS

International Search Report and Written Opinion dated Jan. 17, 2018 in connection with International Application No. PCT/US2017/058864.

International Preliminary Report on Patentability dated Apr. 30, 2019 in connection with International Application No. PCT/US2017/058864.

International Search Report and Written Opinion dated May 5, 2020 in connection with International Application No. PCT/US2019/068416.

Invitation to Pay Additional Fees for International Application No. PCT/US2019/068416 dated Feb. 24, 2020.

International Search Report and Written Opinion dated Jun. 15, 2020 in connection with International Application No. PCT/US2020/022107.

International Search Report and Written Opinion dated May 26, 2017 in connection with International Application No. PCT/US2017/022483.

Reschke et al., Semantic Parsing Engine, U.S. Appl. No. 17/012,319, filed Sep. 4, 2020.

U.S. Appl. No. 16/815,873, filed Mar. 11, 2020, Potts et al.

U.S. Appl. No. 17/012,319, filed Sep. 4, 2020, Reschke et al.

PCT/US2017/022483, May 26, 2017, International Search Report and Written Opinion.

PCT/US2017/058864, Jan. 17, 2018, International Search Report and Written Opinion.

PCT/US2017/058864, Apr. 30, 2019, International Preliminary Report on Patentability.

PCT/US2019/068416, May 5, 2020, International Search Report and Written Opinion.

PCT/US2019/068416, Feb. 24, 2020, Invitation to Pay Additional Fee.

PCT/US2020/022107, Jun. 15, 2020, International Search Report and Written Opinion.

International Preliminary Report on Patentability dated Sep. 23, 2021 in connection with International Application No. PCT/US2020/022107.

Potts et al., Data Storage And Retrieval System Including A Knowledge Graph Employing Multiple Subgraphs And A Linking Layer Including Multiple Linking Nodes, And Methods, Apparatus And Systems For Constructing And Using Same, U.S. Appl. No. 17/355,046, filed Jun. 22, 2021.

U.S. Appl. No. 17/355,046, filed Jun. 22, 2021, Potts et al.

PCT/US2020/022107, Sep. 23, 2021, International Preliminary Report on Patentability.

* cited by examiner

DATASET NETWORKING AND DATABASE MODELING

CLAIM FOR PRIORITY

This application claims the benefit of priority to U.S. Provisional Application No. 62/414,568, filed Oct. 28, 2016, which is hereby incorporated by reference in its entirety.

TECHNICAL FIELD

The subject matter disclosed herein generally relates to the technical field of special-purpose machines for dataset clustering and search engines that facilitate data set navigation and database queries, including software-configured computerized variants of such special-purpose machines and improvements to such variants, and to the technologies by which such special-purpose machines become improved compared to other special-purpose machines that facilitate generation of search results and relational links between discrete data sets using a canonical semantic layer.

BACKGROUND

Conventionally, data systems organize data into discrete sets and using standardized identifiers, categories, and characteristics. This organization enables easier and faster searching by organizing data published or consolidated by a single entity. Data systems searching differing data sets, published across multiple entities, encounter difficulties in correlating organizational structures. Further difficulties are encountered where data sets are provided in differing formats. While conventional data systems may be able to retrieve distinct documents or elements from multiple data sets, these data systems often provide the documents with no context or relation to other documents presented within the same or similar search results. As a result, conventional data systems attempting to draw inferences or determine links between data sets often present results with unacceptable degrees of uncertainty.

BRIEF DESCRIPTION OF THE DRAWINGS

Various ones of the appended drawings merely illustrate example embodiments of the present disclosure and cannot be considered as limiting its scope.

Figure 1:
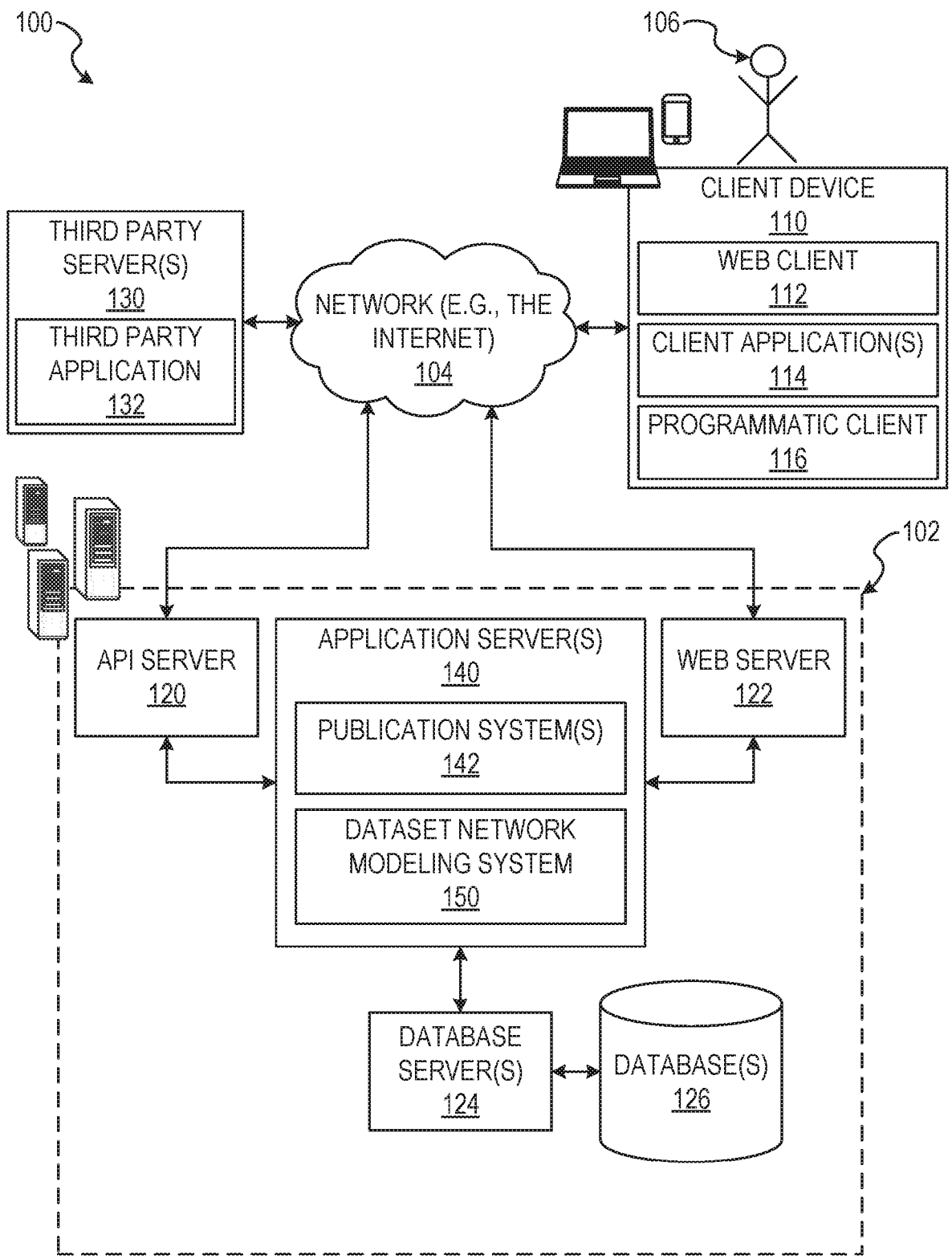
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The systems and methods described herein present embodiments of methods for unifying datasets (e.g., health datasets, industry datasets, scientific research datasets, etc.) into a connected knowledge graph. For example, systems and methods described herein may define a method for unifying heterogeneous health datasets into a connected knowledge graph by first bootstrapping a canonical semantic layer from the underlying sources and then using the graph itself to learn models for adding new edges and nodes into the canonical layer. The systems and methods show that the resulting knowledge graphs can be powerful resources for fitting machine learning models and creating healthcare technologies. Although described with respect to healthcare information, technologies, data sets, and semantic relationships, it should be understood that the systems and methods described herein are able to generate a connected knowledge graph by unifying any suitable data set, information, set of publications, or set of documents using semantic layers organizing or underlying the data sources and using machine learning techniques to generate models to incorporate new edges and/or nodes and relationships into the canonical layer.

Recent releases of datasets (e.g., such as public health released by governments like the United States, industries, or individual entities) offer an unprecedented opportunity to understand the previously undisclosed and modeled aspects for the datasets and industries involved with or producing the datasets. For example, the release of public health data sets enable an opportunity to understand the practice of healthcare in the U.S. These releases outline not only the core ontology of the healthcare space (e.g., doctors, hospitals, manufacturers, drugs, devices, procedures, and so on), but also support serious inquiry into the dynamics of the space, including prescribing behaviors for providers, recalls and adverse events, hospital quality evaluations, population-level psychological and social characteristics, and so forth. Where released datasets involve other industries, similar ontological outlines may be modeled and dynamics of industry practice, governmental regulation, and users (e.g., customer, practitioner, or third party entities) may be similarly investigated and modeled. Further, modeling of industry dynamics and ontologies supports or enables drawing of inferences and links using modeled representations of the datasets.

However, there are many obstacles to realizing the potential of these datasets. Datasets are often released by a wide range of groups and agencies using disparate identifiers and coding schemes. Simple database joins are often foolhardy or impossible, as indicated by difficulties encountered with conventional data search or data representation systems. While recent efforts like the National Provider Identifier (NPI), OpenFDA, and HealthData.gov make efforts in normalization and aggregation of datasets and ontologies, the challenges remain substantial. As will be explained in more detail below, the systems and methods described herein present embodiments of methods for unifying datasets (e.g., health datasets, industry datasets, scientific research datasets, etc.) into a connected knowledge graph and enable drawing of inferences and generating useful search results and analysis from the knowledge graph with suitable levels of certainty.

With reference to FIG. 1, an example embodiment of a high-level client-server-based network architecture 100 is shown. A networked system 102, in the example forms of a network-based predictive modeling system, provides server-side functionality via a network 104 (e.g., the Internet or wide area network (WAN)) to one or more client devices 110. FIG. 1 illustrates, for example, a web client 112 (e.g., a browser, such as the INTERNET EXPLORER® browser developed by Microsoft® Corporation of Redmond, Wash. State), an application 114, and a programmatic client 116 executing on client device 110.

The client device 110 may comprise, but is not limited to, mobile phones, desktop computers, laptops, personal digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display component (not shown) to display information (e.g., in the form of user interfaces). In further embodiments, the client device 110 may comprise one or more of a touch screens, accelerometers, gyroscopes, cameras, microphones, global positioning system (GPS) devices, and so forth.

The client device 110 may be a device of a user that is used to perform a transaction involving object data and predictive models within the networked system 102. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wifi network, a WiMax network, another type of network, or a combination of two or more such networks. Each of the client device 110 may include one or more applications (also referred to as "apps") such as, but not limited to, a web browser, messaging application, electronic mail (email) application, and the like.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and a dataset network modeling systems 150, each of which may comprise one or more components or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store object data, historical data, and predictive modeling data in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party.

The publication system 142 may provide a number of publication, archival, and data storage functions and services to users 106 that access the networked system 102. For example, the publication system 142 may gather, publish, and store object data, historical data for one or more objects, sales data for one or more objects, revenue data for one or more objects, release data for one or more objects, competitor data for one or more objects, publicly distributed datasets for industries, datasets for users or practitioners associated with identified industries, census and other demographic data informing industry datasets, and taxonomy data sets comprising ontological descriptions of industry datasets. The publication system 142 may publish the received or accessed datasets or may provide a consolidated database of the received or accessed datasets to an internal database or publicly available database to enable generation of predictive models and dataset network models based on the datasets. In some embodiments, the publication system 142 accesses one or more third party servers or databases (e.g., the third party server 130) to retrieve, modify, and provision the object data within the database 126.

The dataset network modeling systems 150 may provide functionality operable to perform various dataset network model generation and predictive model generation and manipulation functions, as well as functions for generating graphical representations of datasets, dataset network models, and predictive models. For example, the dataset network modeling systems 150 accesses datasets from the databases 126, the third party servers 130, the publication system 142, the client device 110, and other sources. In some example embodiments, the dataset network modeling systems 150 analyzes portions of the sets of object data to generate dataset network models and predictive models interpreting, drawing inferences from, and supplying search and result retrieval functionality for the accessed datasets. In some example embodiments, the dataset network modeling systems 150 communicates with the publication systems 142 to access the datasets and transmit queries received by the dataset network modeling systems 150 to the publication system 142. In an alternative embodiment, the dataset network modeling systems 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication systems 142 and dataset network modeling systems 150 could also be implemented as standalone software programs, which do not necessarily have networking capabilities.

The web client 112 may access the various publication system 142 and dataset network modeling system 150 via the web interface supported by the web server 122. Similarly, the programmatic client 116 accesses the various services and functions provided by the publication system 142 and dataset network modeling system 150 via the programmatic interface provided by the API server 120.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, data repository, company interaction, or object tracking functions that are supported by the relevant applications of the networked system 102.

Figure 2:
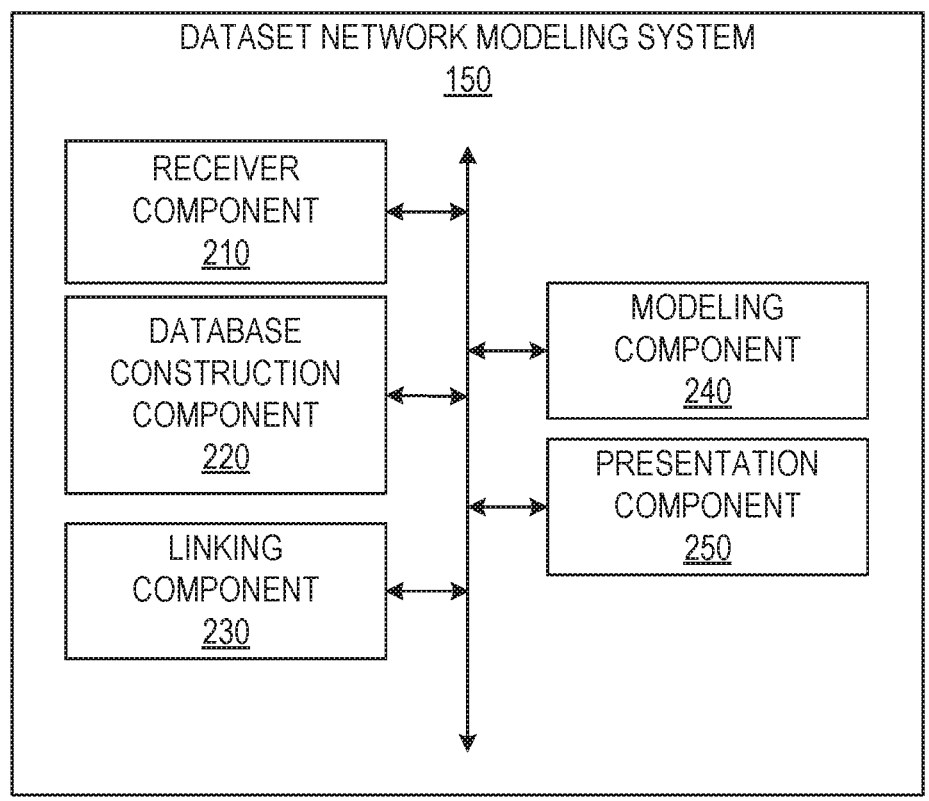
FIG. 2 is a block diagram of an example dataset network modeling system, according to various embodiments.

FIG. 2 is a block diagram illustrating components of the dataset network modeling systems 150, according to some example embodiments. The dataset network modeling systems 150 is shown as including a receiver component 210, a database construction component 220, a linking component 230, a modeling component 240, and a presentation component 250 all configured to communicate with one another (e.g., via a bus, shared memory, or a switch). Any one or more of the components described herein may be implemented using hardware (e.g., one or more hardware processors of a machine) or a combination of hardware and software. For example, any component described herein may configure a processor (e.g., among one or more processors of a machine) to perform operations for which that component is designed. Moreover, any two or more of these components may be combined into a single component, and the functions described herein for a single component may be subdivided among multiple components. Furthermore, according to various example embodiments, components described herein as being implemented within a single machine, database(s) 126, or device (e.g., client device 110) may be distributed across multiple machines, database(s) 126, or devices.

Figure 3:
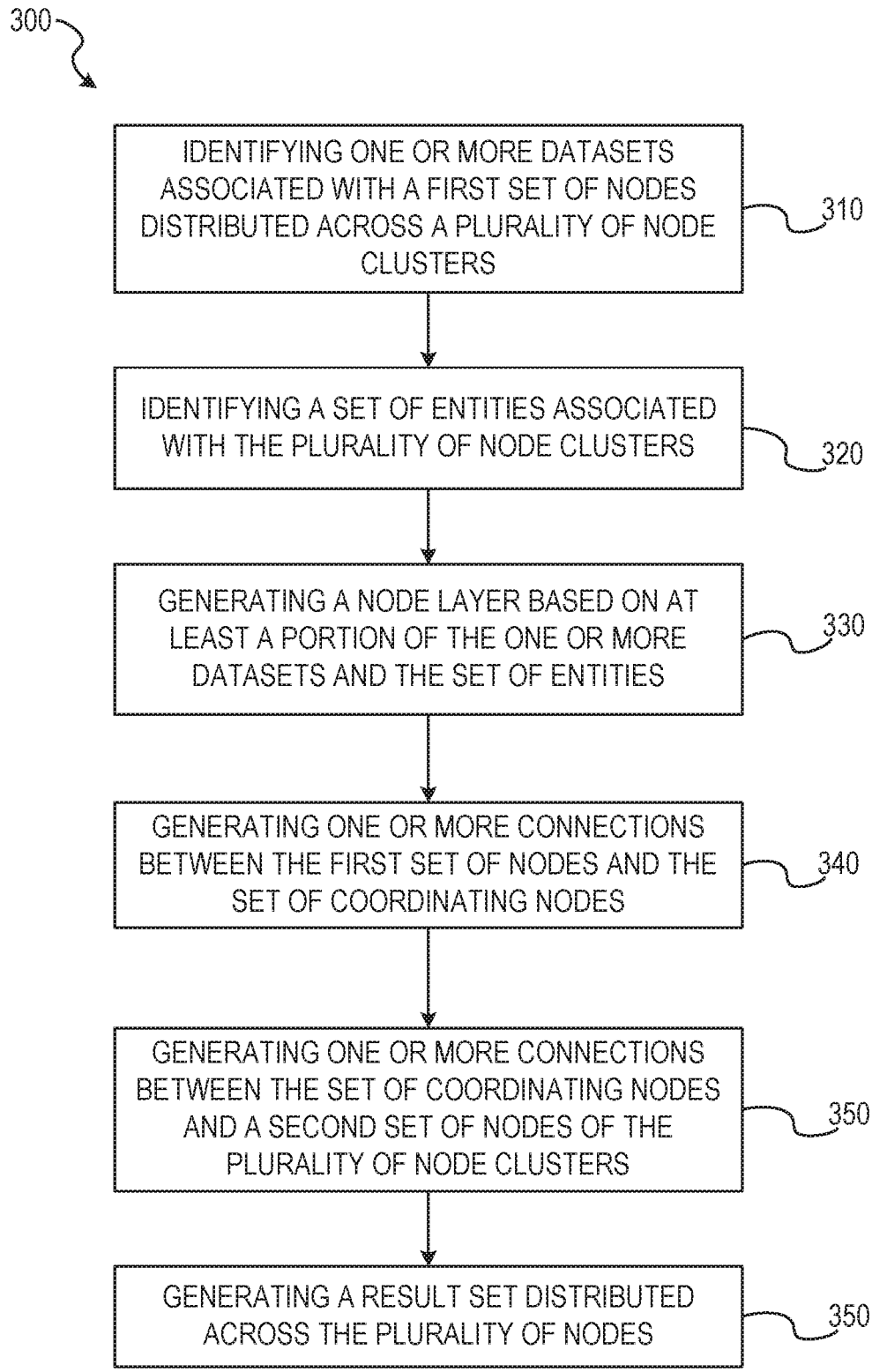
FIG. 3 is a flowchart illustrating an example method of generating node clusters and a data access model for interacting with the node clusters, according to various embodiments.

FIG. 3 is a flowchart of operations of the dataset network modeling system 150 in performing a method 300 of generating node clusters and a data access model for interacting with the node clusters, according to some example embodiments. Operations of the method 300 may be performed by the dataset network modeling system 150, using components described herein.

In operation 310, the receiver component 210 identifies one or more datasets associated with a first set of nodes distributed across a plurality of node clusters. The receiver component 210 may identify the one or more datasets by receiving or being granted access to the one or more datasets within one or more databases (e.g., the databases 126). In some embodiments, the receiver component 210 identifies the one or more datasets, in a first phase of operation, by importing the one or more datasets into isolated namespaces in a graph database (e.g., the databases 126). The isolated namespaces may organize the plurality of node dusters by common attributes or features such as entities, events, concepts, descriptions, and other suitable differentiating information. In some embodiments, isolated namespaces may include relationships. The relationships may indicate similarity, relatedness, common aspects, common characteristics, or any other suitable relationship between two or more nodes within a namespace in a graph database and in a knowledge graph.

In operation 320, the receiver component 210 identifies a set of entities associated with the plurality of node clusters (e.g., more than one node clusters). In some embodiments, the receiver component 210 identifies the set of entities as features contained within nodes of the plurality of node clusters distributed among the isolated namespaces. Each entity of the set of entities may be associated with one or more nodes of a specified node cluster. The entities may include people, organizations, associations, companies, or any other suitable entity for which features, attributes, and characteristics of a node may describe.

In operation 330, the database construction component 220 generates a node layer based on at least a portion of the one or more datasets and the set of entities. The node layer may include a set of coordinating nodes. In some embodiments, the node layer is a canonical layer representing the set of entities associated with the plurality of node clusters. In some embodiments, each node of the node layer corresponds to an entity within the plurality of node clusters.

In some embodiments, the importation of the datasets in the first phase may create a graph menagerie from which the node layer may be generated. In some embodiments, the graph menagerie may comprise the plurality of node clusters as discrete graphs within the graph menagerie. In a second phase of operation, subgraphs within the graph menagerie are used to bootstrap a canonical semantic layer. The canonical semantic layer may represent a core ontology of entities, events, and concepts of one or more of the graph menagerie, the one or more datasets, and the plurality of node clusters. The core ontology of entities, events, and concepts may represent the elements of distinct subgraphs, the graph menagerie as a whole, or combinations thereof. For example, in some instances, the core ontology of entities, events, and concepts may be represented in a manner to indicate a hierarchical or other organization relating the subgraphs to one another and to the graph menagerie as a whole.

In some embodiments, the database construction component 220 generates the node layer using one or more operations or sub-operations. The database construction component 220 may generate coordinating nodes within the node layer. The database construction component 220 then identifies features associated with edges connecting each coordinating node of the node layer with at least one node of the plurality of nodes or plurality of node clusters. For each coordinating node, the database construction component 220 populates features of the coordinating node with one or more features identified within a connected node of the plurality of nodes.

In operation 340, the linking component 230 generates one or more connections between the first set of nodes and the set of coordinating nodes. In some embodiments, in a third phase of operation, the linking component 230 uses the information in the graph (e.g., a subgraph, a set of subgraphs, or the graph menagerie), such as information associated with edges between nodes, to learn how to add new edges into the canonical semantic layer. In some embodiments, the third phase generates a knowledge graph as a result which extends between the one or more coordinating nodes of the node layer and the first set of nodes. The knowledge graph may be a partial knowledge graph of the total set of nodes and node clusters available to the dataset network modeling system 150.

In operation 350, the linking component 230 generates one or more connections between the set of coordinating nodes and a second set of nodes of the plurality of node clusters. The second set of nodes may be third party information stored on and accessed through third party databases stored on the third-party servers 130. During the third phase of operation, the linking component 230 may generate connections between one or more coordinating nodes of the node layer and the second set of nodes of the plurality of node clusters. By generating connections between coordinating nodes of the node layer and the second set of nodes, the linking component 230 may complete the knowledge graph of the total set of nodes and node clusters available to the dataset network modeling system 150. In some embodiments, the result of operations 340 and 350 are a densely interconnected knowledge graph that is a powerful, unified resource for complex inference problems. In some instances, the interconnected knowledge graph enables tracking of data provenance and incorporation of the data provenance into analyses and downstream systems.

In some embodiments, the modeling component 240 generates a data access model interconnecting each set of nodes of the plurality of sets of nodes. The plurality of node clusters may include a plurality of sets of nodes which are connected by the data access model. Generation of the data access model may be performed as part of or in response to performing operations 340 and 350. With respect to the first phase and generation of graph menagerie or the data access model, the first phase of operations generate a rich representation of entities, characteristics, and aspects of the combined subgraphs, datasets, nodes, and node clusters. By way of example, in an embodiment, the datasets incorporated into a graph menagerie are publicly available health datasets. To illustrate the described systems and methods for building connected knowledge graphs, the first phase accessed and retrieved 29 publicly available health datasets. The first phase transformed each health dataset into a graph and placed the health datasets and graphs all in a single Neo4j database. Overall, the health datasets provide a rich picture of doctors, hospitals, drugs, and manufacturers. In the present example, the largest health dataset was a CMS Open Payments dataset. The CMS Open Payments dataset comprises about 23.6 million records. The smallest dataset was a Healthcare Taxonomy. The Healthcare Taxonomy is structured data associating healthcare specialty codes with three-level descriptions, comprising 845 records. The resulting database (e.g., including the graph menagerie) has 112 million nodes and 315 million edges.

An initial example of a database, resulting from generation of the data access model, may be depicted as a graph of partially connected nodes and edge spaces defined by each dataset. The result may be termed a graph menagerie. In some instances, the graph menagerie is a single graph database containing a set of subgraphs that are isolated by design, via namespacing conventions. The set of subgraphs may be potentially biased and fallible when considered in isolation. Each subgraph provides a faithful representation of the underlying source. In some instances, the unconnected subgraphs (e.g., node clusters of the plurality of node clusters) are passed to one or more of the database construction component 220 and the linking component 230, incorporating the functions of the second phase in order to connect the subgraphs or node clusters. Connection of the subgraphs or node clusters improves inferences generated across the subgraphs. In some embodiments, for example, colors may be depicted within the graph menagerie, to represent separate subgraphs or node clusters connected together via the coordinating nodes of the node layer. Although the subgraphs or node clusters occupy the same database, the subgraphs or node clusters are initially isolated by design. The initial isolation represents a state prior to unification. Unification of the subgraphs or node clusters may enable more meaningful inferences and analysis while maintaining faithful representation of each underlying source.

With respect to the second phase, given a graph menagerie, in some embodiments, components of the dataset network modeling system 150 may join entities across subgraphs by adding pairwise edges between them such that each entity is represented by a clique. The pairwise edges may represent connections generated in operations 340 and 350 between the coordinating nodes of the node layer and the first and second sets of nodes of the plurality of node clusters. Adding of pairwise edges may result in a quadratic number of added edges in the number of nodes representing the same entity. The result of pairwise edge adding may be massive proliferation of "is" relations. For example, some previously described graph menagerie examples may contain nine databases with doctor nodes. In some instances, pairwise addition of edges may result in adding 72 edges for a single doctor. In some embodiments, pairwise edge adding is performed without a confidence score for whether a node should be connected to a clique. Subsequently described embodiments enable using all the existing connections when determining if a new node should be connected to a clique and accessing nodes responsive to information queries. These subsequent embodiments, enable annotation of the new edges with a confidence representation that a specified node belongs to the clique. The confidence annotation enables a representation of a certainty in a particular pairwise connection.

As described above, the coordinating nodes of the node layer (e.g., the canonical semantic layer) are connected to the plurality of node clusters by the data access model. Nodes may be identified across the isolated datasets, node clusters, or subgraphs. To do this, in some instances, systems, methods, and components of the dataset network modeling systems 150 performing operations associated with the second phase or operations 330, 340, and 350 represent the clusters as nodes in the designated canonical semantic layer. As new datasets are imported, nodes in them need are similarly parsed and at least a single connection is generated for the nodes of the newly added datasets. The at least one single connection for the dataset incorporates a connection for the dataset into this layer (e.g., the canonical semantic layer) in order to be included in the cluster. Where such connections are model-based, components of the dataset network modeling systems 150 use at least a portion of the information on the nodes connected to the canonical semantic layer to use for featurization and learning.

The canonical semantic layer may generate fewer edges than a simple pairwise set of connections between nodes of the plurality of node clusters. The canonical layer, in some embodiments, may provide a benefit in slower growth of edges, as the number of nodes representing this entity increases. Canonical semantic layer generation also permits connecting a node to several clusters with varying confidence. This may be useful in the case where insufficient information is available to make an exact match, but enough to limit to a few possibilities. Where node clusters are separated by distinct colors (e.g., yellow, green, and blue), multiple nodes of varying color may be known to represent the same entity, for example in the first set of nodes of the plurality of node clusters. Another node (e.g., a purple node), from a separate dataset (e.g., the second set of nodes), may also represent the initial entity. Pairwise connection embodiments may generate three edges connecting a subgraph to the purple node. The canonical semantic layer embodiment may generate a single connection between the subgraph and the purple node.

The canonical semantic layer, in a space like healthcare, may enable large numbers of high quality public datasets to be connected with fewer edges. The canonical semantic layer may simplify a process for defining a core ontology of entities, relations, and concepts. Because of the amount of public data at hand (e.g., datasets), the canonical semantic layer may be able to be bootstrapped from existing databases. For instance, the National Provider Identifier dataset provides an extensive listing of providers, and the National Drug Code offers a similar picture of approved drugs. Such resources can be used to populate the semantic layer initially. From there, adding new entities can be done with more confidence because the graph already generated by the application of the initial canonical semantic layer contains so much information about the relevant domains. Further, newly added entities, nodes, or node clusters may be used to modify or otherwise update preexisting confidence scores. For example, where information from a newly added node cluster reinforces or confirms information represented by previously established edges extending between nodes. Edges may also be annotated with confidence values to represent a veracity of a relationship between nodes. In some embodiments, as the canonical layer is enriched and expanded, the systems and methods maintain connections to the original, faithfully represented datasets. This allows the dataset network modeling systems 150 to treat provenance as a first-class construct to verify results, ensure data security, and adjudicate cases where the evidence is contradictory, to name just a few examples. In some embodiments, connections between the canonical semantic layer and nodes of the plurality of node clusters may enable correction or disregard for errors contained in the plurality of node clusters. The dataset network modeling system 150 may use connections, spelling rules, grammar rules, syntax rules, and corroborating information to identify errors within a node of the plurality of node clusters. For example, where a node of the canonical semantic layer represents an entity, such as a doctor, the dataset network modeling system 150 may ignore a spelling error in the doctor's name which occurs in a node to which the canonical semantic layer node is connected. The dataset network modeling system 150 may identify the spelling error by a spelling correction distance, a spelling rule, or a grammar rule. The dataset network modeling system 150 may then use corroborating attributes or information, such as a matching location listed for the doctor in the canonical semantic layer and the node in the node cluster. The dataset network modeling system 150, verifying or inferring the doctor of the two nodes is the same, despite the spelling error may correct the mistake in the node cluster by ignoring the spelling error and establishing the edge between the specified nodes without modifying the original data within the node of the plurality of node clusters.

In some example embodiments, the dataset network modeling systems 150 enables modeling and predictions using the knowledge graph generated from the graph menagerie and the canonical semantic layer or other methods of linking the subgraphs. For example, the dataset network modeling systems 150 may enable featurization by assembling the information for representing examples in machine learning models. Featurization may be used to incorporate additional information into coordinating nodes of the node layer and provide additional context using machine learning techniques. In some circumstances, such as previously known systems, featurization is a labor-intensive process of joining large databases with custom code. In a graph database containing a canonical semantic layer, such as the dataset network modeling system 150 and the data access model, featurization is a single graph query that begins at the canonical semantic layer and extends out into the available subgraphs. This may enable projects that would take an undesirably long time with normal databases to be completed in a suitably short period of time, such as just seconds or near real-time.

In operation 360, the modeling component 240 generates a result set distributed across the plurality of nodes based on connections between the set of coordinating nodes and one or more of the first set of nodes and the second set of nodes. In some embodiments, the result set is generated responsive to a query. The result set may be generated using pairwise matching of fields or features. In some embodiments, the modeling component 240 identifies a field value within the query. The modeling component 240 determines a candidate match of a field associated with a node of the second set of nodes. The candidate match may have a value matching the field value of the query or may be an inferred match based on characteristics, aspects, or other defining characteristics of a field in a node having a connection to a coordinating node of the node layer, where the coordinating node has a field value matching the field value of the query. The modeling component 240 then selects a value for the candidate match of the node of the second set of nodes for inclusion in the result set.

In some instances, the dataset network modeling systems 150 enables modeling, prediction, and knowledge discovery within the datasets. Large connected graphs (e.g., the interconnected datasets, health graphs, etc.) may contain an enormous amount of latent structure. The latent structure may comprise subtle behavioral patterns, influencer networks, multidimensional notions of similarity, and so forth, in response to receiving the query, the dataset network modeling system 150 may enable knowledge discovery to be performed using the canonical semantic layer, such as by using pooled information connected via a canonical semantic layer. In building and using knowledge graphs, the modeling component 240 may harvest information from the node clusters by crawling or following edges extending between coordinating nodes of the node layer and nodes within the plurality of node clusters. The modeling component 240 may combine information harvested from the nodes within the plurality of node clusters into coordinating nodes or metadata or other data structures associated with the coordinating nodes. The knowledge discovery process may be triggered by receipt of the query and provide information to populate the result set. In some instances, knowledge discovery triggered by receipt of a query may trigger subsequent searches by the data access model to populate the result set using newly defined edges resulting from the knowledge discovery process.

Figure 4:
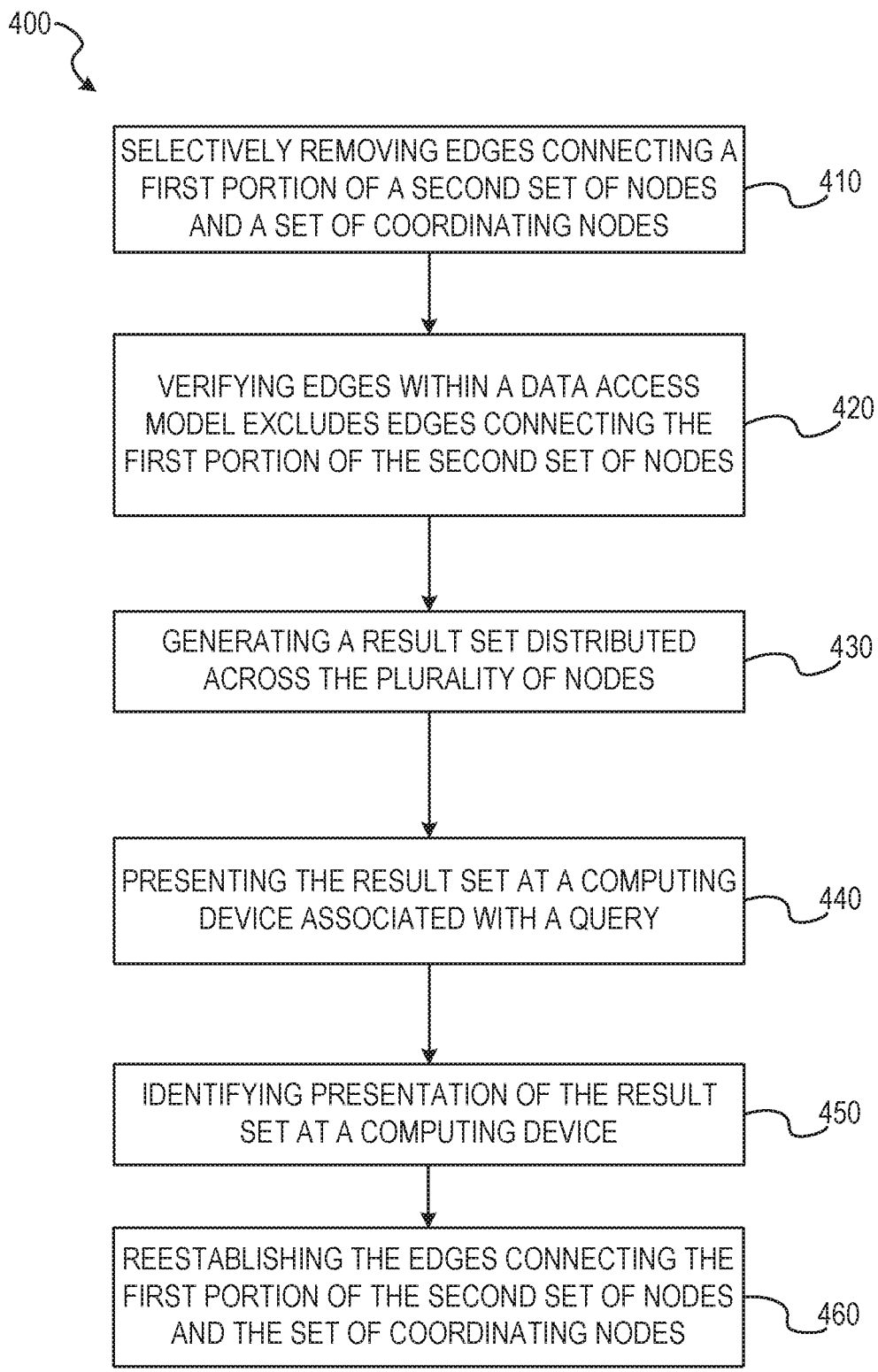
FIG. 4 is a flowchart illustrating an example method of generating node clusters and a data access model for interacting with the node clusters, according to various embodiments.

FIG. 4 is a flowchart of operations of the dataset network modeling system 150 in performing a method 400 of generating node clusters and a data access model for interacting with the node clusters, according to some example embodiments. Operations of the method 400 may be performed by the dataset network modeling system 150, using components described herein. In some embodiments, operations of the method 400 are performed as part of, sub-operations of, or in response to receiving a query. The operations of method 400 may be performed during or prior to performing operation 360, described above with respect to FIG. 3.

In operation 410, the linking component 230 selectively removes edges connecting a first portion of the second set of nodes and the set of coordinating nodes. In some embodiments, the linking component 230 selectively removes the edges by interaction with the modeling component 240. In such embodiments, the data access model may be accessed and the edges between the first portion of nodes and the associated coordinating nodes may be removed or suspended within the data access model. Removal or suspension of edges within the data access model may enable interaction with the interconnected database or the connected knowledge graph without modifying the underlying database or knowledge graph. Edges may be temporarily suspended by removing a reference to the edge from a single node (e.g., the coordinating node), by annotating the temporary suspension or removal in metadata associated with the edges, or any other suitable manner.

In operation 420, the modeling component 240 verifies the edges within the data access model exclude edges connecting the first portion of the second set of nodes. The edges being verified may extend between the set of coordinating nodes, the first set of nodes, and the second set of nodes. Verification of the edges may be performed by one or more internal operations of the modeling component 240 by parsing, tracing, or otherwise reviewing edges present within the data access model. In some instances, verification is performed automatically responsive to the selective removal of edges.

In operation 430, the modeling component 240 generates a result set distributed across the plurality of nodes included in the first set of nodes, the set of coordinating nodes, and a second portion of the second set of nodes. The result set may be generated responsive to a query. In some embodiments, the result set may be generated in a manner similar to or the same as described above with respect to operation 360.

In operation 440, the presentation component 250 presenting the result set at a computing device associated with the query. The result set may be presented within a graphical user interface depicted on a display device of the computing device. For example, the result set may be presented as search results within a database search application accessing the data access model of the dataset network modeling system 150. The result set may be presented based on relevance to terms or features of the query, entities identified by the data access model in the node layer, or any other suitable manner. In some embodiments, individual results or data records included in the result set may be presented as selectable icons within the graphical user interface. The selectable icons may correspond to links, selection of which, directs the graphical user interface to a record within the interconnected database or in a third party database stored on the third party server 130.

In operation 450, the linking component 230 identifies presentation of the result set at the computing device. Upon presentation of the result set, the presentation component 250 may interact with the linking component 230 or transmit a signal to the linking component 230 to confirm presentation of the result set. In some embodiments, upon transmission of the result set to the computing device, the presentation component 250 may trigger the linking component 230 to identify presentation of the result set.

In operation 460, the linking component 230 reestablishes the edges connecting the first portion of the second set of nodes and the set of coordinating nodes. In some embodiments, the linking component 230 reestablishes the edges based on presentation of the result set. The linking component 230 may reestablish edges which were removed or suspended within the interconnected database or connected knowledge graphs. Where the edges were removed from the data access model, the linking component 230 may interact with the modeling component 240 to reestablish the edges connecting the first portion of the second set of nodes and the set of coordinating nodes.

Figure 5:
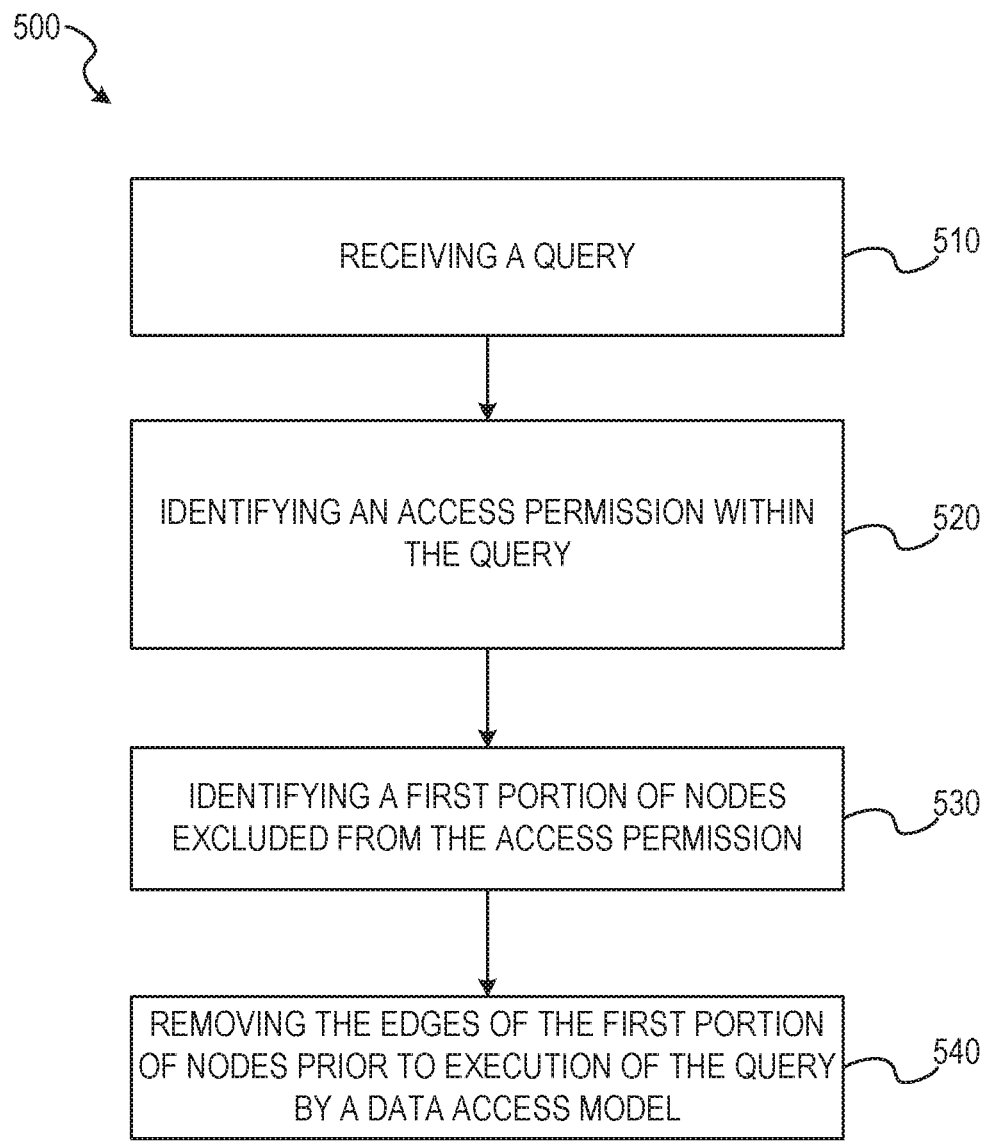
FIG. 5 is a flowchart illustrating an example method of generating node clusters and a data access model for interacting with the node clusters, according to various embodiments.

FIG. 5 is a flowchart of operations of the dataset network modeling system 150 in performing a method 500 of generating node clusters and a data access model for interacting with the node clusters, according to some example embodiments. Operations of the method 500 may be performed by the dataset network modeling system 150, using components described herein. In some embodiments, operations of the method 500 may be performed as part of, as sub-operations of, or in response to performance of operation 410, described above with respect to FIG. 4.

In operation 510, the receiver component 210 receives a query. The query containing one or more attributes, features, values, or other information to be compared to nodes within node clusters of a database. In some embodiments, the attributes, features, values, and other information may be provided by a user generating the query. The information provided by the user may be formatted, such as by selection of icons or specified query options from a menu, or free form, such as text entered via a text entry box. The one or more attributes may comprise an access permission. Access permissions may be selected by a user generating the query, based on access permissions associated with the user (e.g., databases or records the user is allowed to access), based on access permissions associated with a computing device or network in use by the user in generating the query, or any other suitably defined access permission.

In some embodiments, the query contains a confidence threshold. The confidence threshold may indicate a user selected confidence value for edges used by the data access module to source populate a result set responsive to the query. The confidence threshold may also be automatically determined or initially set. In some instances, where the data access model does not provide or locate suitable information responsive to the query, the specified confidence threshold may be modified and the query performed again.

In operation 520, the receiver component 210 identifies an access permission within the query. In some embodiments, the access permission corresponds to nodes of the plurality of node clusters available to the query. For example, where a user is associated with a company, the user may have access permissions, included in the query, indicating that the user has permission to access database records associated with the company. Similarly, the access permissions may be negative permissions, preventing users from accessing nodes unless explicitly authorized. As described above, the access permission may also correspond to a computing device or a user associated with the query.

In operation 530, the modeling component 240 identifies a first portion of nodes excluded from the access permission. In some embodiments, the first portion of nodes may be identified within the data access model. The first portion of nodes may also be identified within the interconnected database or connected knowledge graph. The first portion of nodes may be identified based on access permission information contained in the node, in database records associated with the nodes, within metadata associated with the nodes, or any other suitable source.

In operation 540, the linking component 230 removes the edges of the first portion of nodes prior to execution of the query by the data access model. As described above with respect to operation 410, the linking component 230 or the modeling component 240 may selectively or temporarily remove the edges of the first portion of nodes within the data access model. In some embodiments, once the edges are removed or suspended, the linking component 230 transmits a notification to the modeling component 240 to perform the query using a modified version of the data access model with the removed or suspended edges.

In some instances, the dataset network modeling systems 150 enables modeling, prediction, and regulatory activities. The regulatory activities may bear resemblance to census applications, in some embodiments. Even official registries for highly regulated domains like healthcare are inevitably partial and contain mistakes. When many such resources are knitted together with a canonical semantic layer, as in the dataset network modeling systems 150, the system and methods can generate, model, infer, or otherwise obtain a more comprehensive picture, reconciling inconsistencies and imputing missing information, as discussed above with respect to FIGS. 3-5.

In some instances, the dataset network modeling systems 150 enables modeling, prediction, and data search and retrieval using natural language searches, as described above with respect to FIG. 3. Even very highly structured knowledge graphs may present an accessibility challenge. In some circumstances, access to the knowledge graphs may be enabled via natural language query systems, with some limitations. A canonical semantic layer of the dataset network modeling systems 150, provides a schema for automatically generating, modeling, or otherwise developing the lexicons and grammars required by such systems. In some instances, these lexicons and grammars are generated by automated machine learning processes modeled using the canonical semantic layer and the generated knowledge graph of the third phase.

In some instances, the dataset network modeling systems 150 enables modeling, prediction, and micro-segmentation of populations represented within the datasets and the knowledge graph, such as for use in selectively removing edges during queries of access controlled databases or node clusters described in FIG. 4. In the example embodiment using healthcare datasets as an example, healthcare industries have use-cases that depend on dividing up populations for specific purposes. Some examples comprise (a) clinical trials operations groups need to find study participants; (b) salespeople need to identify suitable providers for their products and patients who will respond well to the therapies they are selling; and (c) epidemiologists need to identify populations that are vulnerable for specific conditions. Such segmentations benefit from large and diverse datasets. Further, segmentations benefit from properly organized datasets having high confidence values for the organizational structure. In some embodiments, the canonical semantic layer of the dataset network modeling systems 150, enables such segmentation using the canonical semantic layer.

According to various example embodiments, one or more of the methodologies described herein may facilitate generation and manipulation of datasets into networked datasets linked from an initial graph menagerie and predictive models based on a complex set of interconnected datasets using semantic and canonical graph layers. Methodologies for generating and modifying the dataset network models, predictive models, and associated user interface elements automatically refresh or modify underlying dataset relationships and models to determine contextually relevant data and relationships among data stored within the database 126 of the publication system 142. Accordingly, one or more of the methodologies described herein may have the effect of allowing a user to navigate through varying datasets having initially distinct ontological organizations using dataset network models and predictive models, and to generate inferences and assumptions based on the interconnected datasets, thereby enabling accurate modeling, investigation, and search result retrieval from the datasets.

Modules, Components, and Logic

Certain embodiments are described herein as including logic or a number of components, modules, or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Machine and Software Architecture

The components, methods, applications and so forth described in conjunction with FIGS. 2-5 are implemented in some embodiments in the context of a machine and an associated software architecture. In various embodiments, the components, methods, applications and so forth described above are implemented in the context of a plurality of machines, distributed across and communicating via a network, and one or more associated software architectures. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the present embodiments in different contexts from the disclosure contained herein.

Software Architecture

Figure 6:
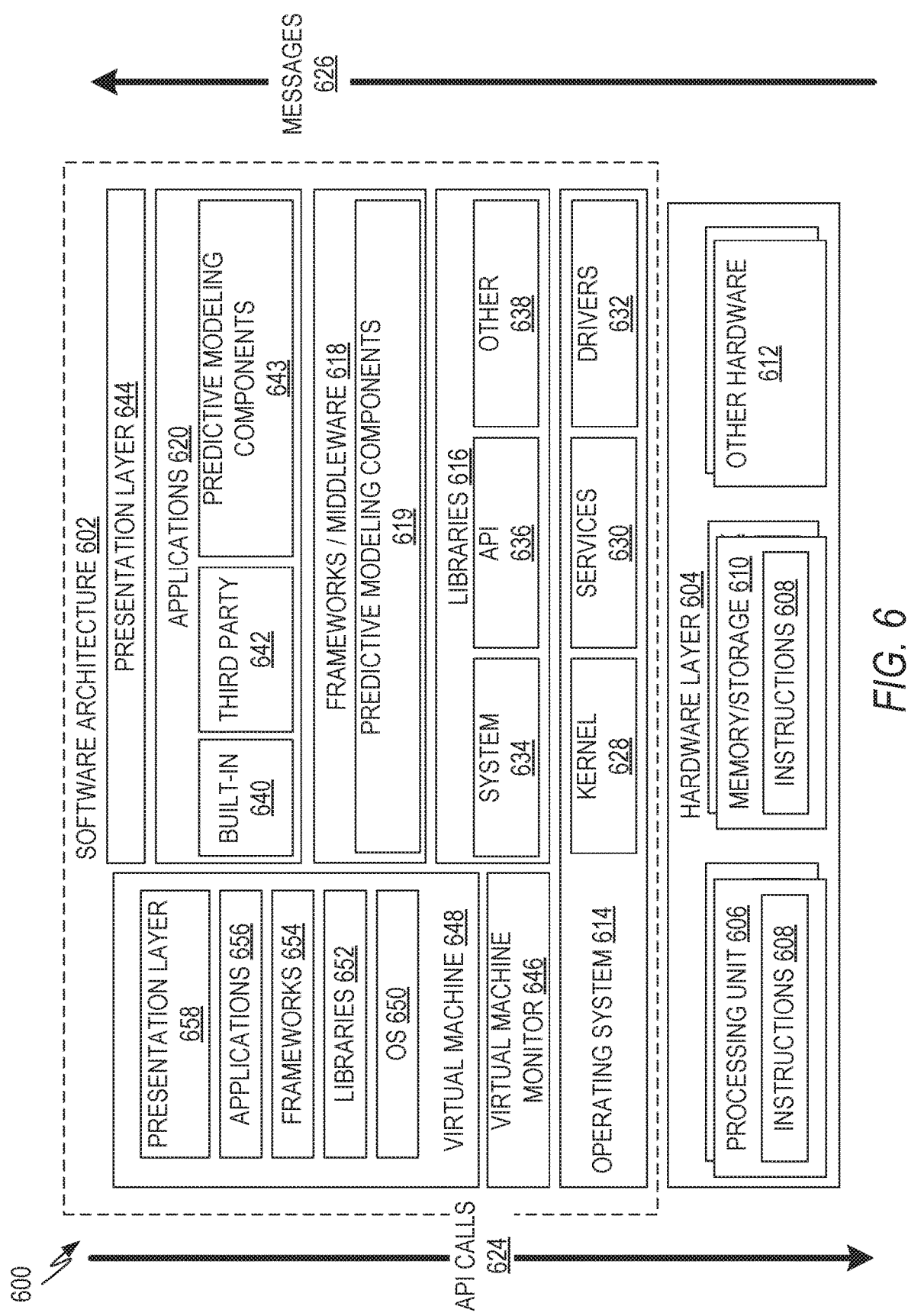
FIG. 6 is a block diagram illustrating an example of a software architecture that may be installed on a machine, according to some example embodiments.

FIG. 6 is a block diagram 600 illustrating a representative software architecture 602, which may be used in conjunction with various hardware architectures herein described. FIG. 6 is merely a non-limiting example of a software architecture and it will be appreciated that many other architectures may be implemented to facilitate the functionality described herein. The software architecture 602 may be executing on hardware such as machine 700 of FIG. 7 that includes, among other things, processors 710, memory 730, and Input/Output (I/O) components 750. A representative hardware layer 604 is illustrated and can represent, for example, the machine 600 of FIG. 6. The representative hardware layer 604 comprises one or more processing units 606 having associated executable instructions 608. Executable instructions 608 represent the executable instructions of the software architecture 602, including implementation of the methods, components, and so forth of FIGS. 2-5. Hardware layer 604 also includes memory and/or storage components 610 (e.g., processor-readable storage media), which also have executable instructions 608. Hardware layer 604 may also comprise other hardware as indicated by 612, which represents any other hardware of the hardware layer 604, such as the other hardware illustrated as part of machine 800.

In the example architecture of FIG. 6, the software 602 may be conceptualized as a stack of layers where each layer provides particular functionality. For example, the software 602 may include layers such as an operating system 614, libraries 616, frameworks/middleware 618, applications 620, and presentation layer 622. Operationally, the applications 620 and/or other components within the layers may invoke API calls 624 through the software stack and receive a response, returned values, and so forth, illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software components to perform tasks in an easier fashion than to interface directly with the underlying operating system 614 functionality (e.g., kernel 628, services 630 and/or drivers 632). The libraries 616 may include system 634 libraries C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as Moving Pictures Experts Group 4 (MPEG4), H.264, MP3, Advanced Audio Coding (AAC), Adaptive Multi-Rate (AMR), Joint Photographic Experts Group (JPEG), Portable Network Graphics (PNG)), graphics libraries (e.g., an OpenGL framework that may be used to render two dimensions and three dimensions in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be utilized by the applications 620 and/or other software components/modules. For example, the frameworks 618 may provide various graphical user interface functions, high-level resource management, high-level location services, and so forth. The frameworks 618 may provide a broad spectrum of other APIs that may be utilized by the applications 620 and/or other software components/modules, some of which may be specific to a particular operating system or platform. In some example embodiments, predictive modeling components 619 (e.g., one or more components of the dataset network modeling systems 150) may be implemented at least in part within the middleware/frameworks 618. For example, in some instances, at least a portion of the database construction component 220 and the presentation component 250, providing graphical and nongraphical user interface functions, may be implemented in the middleware/frameworks 618. Similarly, in some example embodiments, portions of one or more of the receiver component 210, the linking component 230, and the modeling component 240 may be implemented in the middleware/frameworks 618.

The applications 620 include built-in applications 640, third party applications 642, and/or predictive modeling components 643 (e.g., user facing portions of one or more of the components of the dataset network modeling system 150). Examples of representative built-in applications 640 may include, but are not limited to, a contacts application, a browser application, a book reader application, a location application, a media application, a messaging application, and/or a game application. Third party applications 642 may include any of the built in applications as well as a broad assortment of other applications. In a specific example, the third party application 642 (e.g., an application developed using the Android™ or iOS™ software development kit (SDK) by an entity other than the vendor of the particular platform) may be mobile software running on a mobile operating system such as iOS™ Android™ Windows® Phone, or other mobile operating systems. In this example, the third party application 642 may invoke the API calls 624 provided by the mobile operating system such as operating system 614 to facilitate functionality described herein. In various example embodiments, the user facing portions of the predictive modeling components 643 may include one or more components or portions of components described with respect to FIG. 2. For example, in some instances, portions of the receiver component 210, the database construction component 220, the linking component 230, the modeling component 240, and the presentation component 250, associated with user interface elements (e.g., data entry and data output functions), may be implemented in the form of an application.

The applications 620 may utilize built in operating system functions (e.g., kernel 628, services 630 and/or drivers 632), libraries (e.g., system 634, APIs 636, and other libraries 638), frameworks/middleware 618 to create user interfaces to interact with users of the system, Alternatively, or additionally, in some systems interactions with a user may occur through a presentation layer, such as presentation layer 644. In these systems, the application/component "logic" can be separated from the aspects of the application/component that interact with a user.

Some software architectures utilize virtual machines. In the example of FIG. 6, this is illustrated by virtual machine 648. A virtual machine creates a software environment where applications/components can execute as if they were executing on a hardware machine (such as the machine of FIG. 8, for example). A virtual machine is hosted by a host operating system (operating system 614 in FIG. 6) and typically, although not always, has a virtual machine monitor 646, which manages the operation of the virtual machine as well as the interface with the host operating system (i.e., operating system 614). A software architecture executes within the virtual machine such as an operating system 650, libraries 652, frameworks/middleware 654, applications 656 and/or presentation layer 658. These layers of software architecture executing within the virtual machine 648 can be the same as corresponding layers previously described or may be different.

Example Machine Architecture and Machine-Readable Medium

Figure 7:
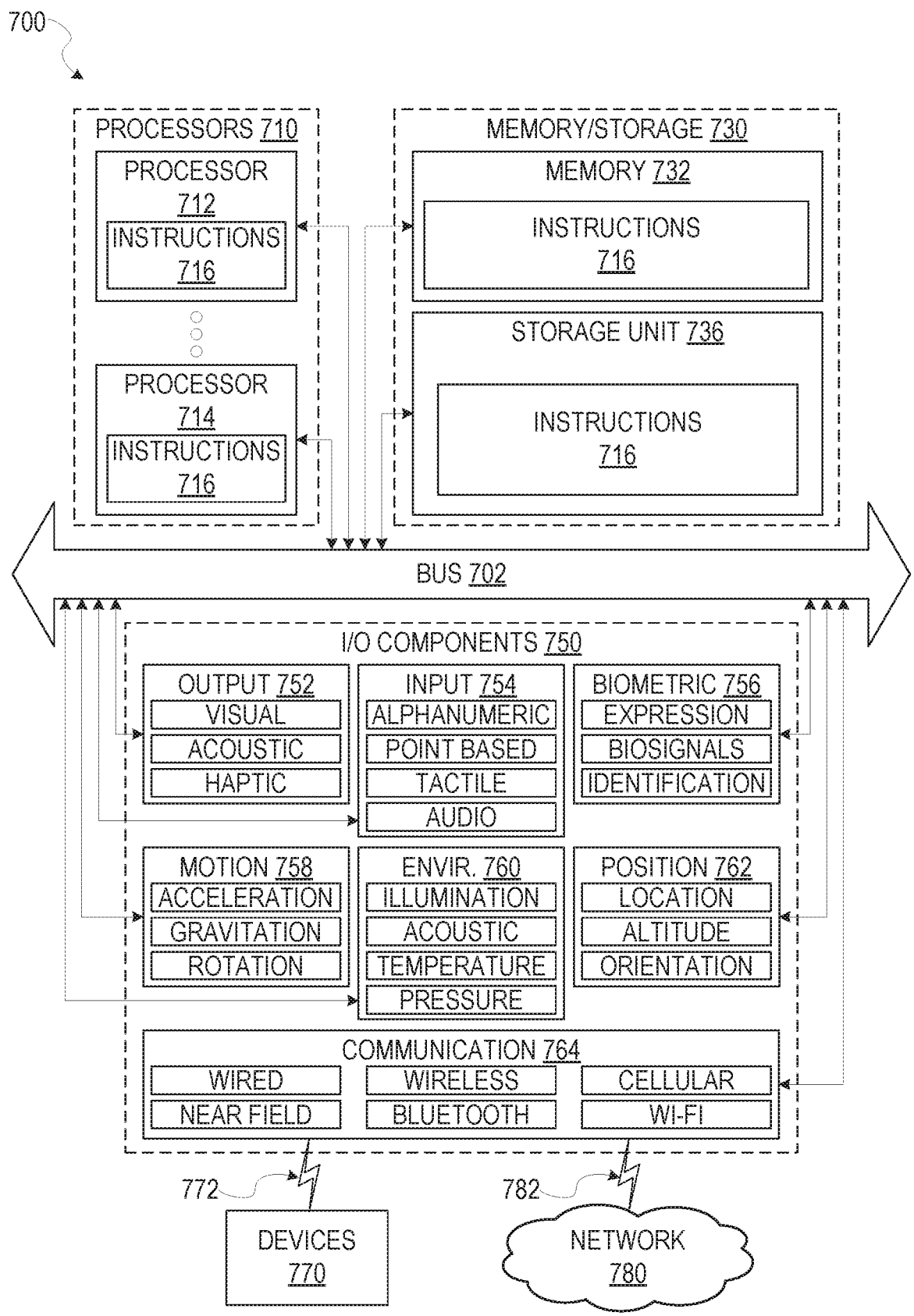
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions (e.g., processor executable instructions) from a machine-readable medium (e.g., a non-transitory machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example the instructions may cause the machine to execute methods described herein. Additionally, or alternatively, the instructions may implement the receiver component 210, the database construction component 220, the linking component 230, the modeling component 240, and the presentation component 250 of FIG. 2, and so forth. The instructions transform the general, non-programmed machine into a particular machine programmed to carry out the described and illustrated functions in the manner described.

In alternative embodiments, the machine 700 operates as a standalone device or may be coupled (e.g., networked) to other machines in a networked system. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box, an entertainment media system, a web appliance, a network router, a network switch, a network bridge, or any machine capable of executing the instructions 716, sequentially or otherwise, that specify actions to be taken by machine 700. In some example embodiments, in the networked deployment, one or more machines may implement at least a portion of the components described above. The one or more machines interacting with the machine 700 may comprise, but not be limited to a PDA, an entertainment media system, a cellular telephone, a smart phone, a mobile device, a wearable device (e.g., a smart watch), a smart home device (e.g., a smart appliance), and other smart devices. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), anASIC, a Radio-Frequency Integrated Circuit (RFIC), another processor, or any suitable combination thereof) may include, for example, processor 712 and processor 714 that may execute instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core process), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of processors 710 are examples of machine-readable media or processor-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 757, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect sensors to detection concentrations of hazardous gases for safety or to measure pollutants in the atmosphere), or other components that may provide indications, measurements, or signals corresponding to a surrounding physical environment. The position components 762 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772, respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for analyzing data in a plurality of datasets, including a first dataset and a second dataset, the first dataset and the second dataset involving heterogeneous health datasets, the method comprising:
    transforming, by one or more hardware processors, the first dataset into a first plurality of isolated node clusters, each node cluster comprising a plurality of nodes connected by edges;
    identifying, by the one or more hardware processors, a set of entities associated with the first plurality of isolated node clusters;
    generating, by the one or more hardware processors, a node layer comprising a set of coordinating nodes based at least in part on the set of entities, wherein the one or more hardware processors selects the coordinating nodes based on a confidence that the selected coordinating node is a canonical representation of one or more entities in the set of entities;
    generating, by the one or more hardware processors, one or more connections between nodes of the first plurality of isolated node clusters and the set of coordinating nodes;
    transforming, by one or more hardware processors, the second dataset into a second plurality of isolated node clusters, each node cluster comprising a plurality of nodes connected by edges;
    generating, by the one or more hardware processors, one or more connections between nodes of the second plurality of isolated node clusters and the set of coordinating nodes; and
    responsive to a query, generating, by the one or more hardware processors, a result set distributed across the first dataset and the second dataset based on at least a portion of the connections between the set of coordinating nodes and one or more nodes of the first plurality of isolated node clusters and the second plurality of isolated node clusters.

2. The method of claim 1, comprising:
    generating a data access model for interconnecting the first plurality of isolated node clusters and the second plurality of isolated node clusters.

3. The method of claim 2, wherein generating the result set comprises:
    selectively removing edges connecting a first portion of nodes of the second plurality of isolated node clusters and the set of coordinating nodes;
    verifying the edges within the data access model exclude edges connecting the first portion of nodes of the second plurality of isolated node clusters; and
    generating the result set, responsive to the query, distributed across the first dataset and the second dataset.

4. The method of claim 3, comprising:
    identifying presentation of the result set to a computing device associated with the query; and
    based on presentation of the result set, reestablishing the edges connecting the first portion of nodes of the second plurality of isolated node clusters and the set of coordinating nodes.

5. The method of claim 3, wherein selectively removing the edges of the first portion of nodes comprises:
    identifying an access permission within the query, the access permission corresponding to nodes of the second plurality of node clusters available to the query;
    identifying the first portion of nodes is excluded from the access permission; and
    removing the edges of the first portion of nodes prior to execution of the query by the data access model.

6. The method of claim 1, wherein generating the result set comprises:
    identifying a field value within the query;
    determining a candidate match of a field associated with a node of the second plurality of isolated node clusters; and
    selecting a value for the candidate match of the node of the second plurality of isolated node clusters for inclusion in the result set.

7. The method of claim 1, wherein generating the one or more connections between the nodes of the first plurality of isolated node clusters and the set of coordinating nodes comprises:
    when a node of the first plurality of isolated node clusters comprises a first entity that is within a correction distance of a second entity represented by a coordinating node of the set of coordinating nodes, generating a connection between the node of the first plurality of isolated node clusters comprising the first entity and the coordinating node representing the second entity.

8. The method of claim 1, wherein generating the node layer further comprises:
    generating the set of coordinating nodes;
    identifying features associated with edges connecting each coordinating node of the node layer with at least one node of the first plurality of isolated node clusters; and
    for each coordinating node, populating features of the coordinating node with one or more features identified with a connected node of the first plurality of isolated node clusters.

9. The method for analyzing data in a plurality of datasets of claim 1,
    wherein the plurality of datasets comprise clinical research datasets.

10. A system for analyzing data in a plurality of datasets, including a first dataset and a second dataset, the first dataset and the second dataset involving heterogeneous health datasets, comprising:

one or more processors; and a processor-readable storage medium storing processor executable instructions that, when executed by the one or more processors, cause the one or more processors to perform operations comprising:

transforming the first dataset into a first plurality of isolated node clusters, each node cluster comprising a plurality of nodes connected by edges;

identifying a set of entities associated with the first plurality of isolated node clusters;

generating a node layer comprising a set of coordinating nodes based at least in part on the set of entities, wherein the one or more hardware processors selects the coordinating nodes based on a confidence that the selected coordinating node is a canonical representation of one or more entities in the set of entities;

generating one or more connections between nodes of the first plurality of isolated node clusters and the set of coordinating nodes;

transforming the second dataset into a second plurality of isolated node clusters, each node cluster comprising a plurality of nodes connected by edges;

generating, by the one or more hardware processors, one or more connections between nodes of the second plurality of isolated node clusters and the set of coordinating nodes; and responsive to a query, generating a result set distributed across the first dataset and the second dataset based on at least a portion of the connections between the set of coordinating nodes and one or more nodes of the first plurality of isolated node clusters and the second plurality of isolated node clusters.

11. The system of claim 10, comprising:

generating a data access model for interconnecting the first plurality of isolated node clusters and the second plurality of isolated node clusters.

12. The system of claim 11, wherein generating the result set comprises:

selectively removing edges connecting a first portion of nodes of the second plurality of isolated node clusters and the set of coordinating nodes;

verifying the edges within the data access model exclude edges connecting the first portion of nodes of the second plurality of isolated node clusters; and generating the result set, responsive to the query, distributed across the first dataset and the second dataset.

13. The system of claim 12, comprising:

identifying presentation of the result set to a computing device associated with the query; and based on presentation of the result set, reestablishing the edges connecting the first portion of nodes of the second plurality of isolated node clusters and the set of coordinating nodes.

14. The system of claim 12, wherein selectively removing the edges of the first portion of nodes comprises:

identifying an access permission within the query, the access permission corresponding to nodes of the second plurality of node clusters available to the query;

identifying the first portion of nodes is excluded from the access permission; and removing the edges of the first portion of nodes prior to execution of the query by the data access model.

15. The system of claim 10, wherein generating the result set comprises:

identifying a field value within the query;

determining a candidate match of a field associated with a node of the second plurality of isolated node clusters; and selecting a value for the candidate match of the node of the second plurality of isolated node clusters for inclusion in the result set.

16. The system of claim 10, wherein generating the node layer further comprises:

generating the set of coordinating nodes;

identifying features associated with edges connecting each coordinating node of the node layer with at least one node of the first plurality of isolated node clusters; and for each coordinating node, populating features of the coordinating node with one or more features identified with a connected node of the first plurality of isolated node clusters.

17. A non-transitory processor-readable storage medium comprising instructions for analyzing data in a plurality of datasets, including a first dataset and a second dataset, the first dataset and the second dataset involving heterogeneous health datasets, the instructions, when executed by one or more hardware processors of a machine, causing the machine to implement operations comprising:

transforming the first dataset into a first plurality of isolated node clusters, each node cluster comprising a plurality of nodes connected by edges;

identifying a set of entities associated with the first plurality of isolated node clusters;

generating a node layer comprising a set of coordinating nodes based at least in part on the set of entities, wherein the one or more hardware processors selects the coordinating nodes based on a confidence that the selected coordinating node is a canonical representation of one or more entities in the set of entities;

generating one or more connections between nodes of the first plurality of isolated node clusters and the set of coordinating nodes;

transforming the second dataset into a second plurality of isolated node clusters, each node cluster comprising a plurality of nodes connected by edges;

generating, by the one or more hardware processors, one or more connections between nodes of the second plurality of isolated node clusters and the set of coordinating nodes; and responsive to a query, generating a result set distributed across the first dataset and the second dataset based on at least a portion of the connections between the set of coordinating nodes and one or more nodes of the first plurality of isolated node clusters and the second plurality of isolated node clusters.

18. The processor-readable storage medium of claim 17, comprising:

generating a data access model for interconnecting the first plurality of isolated node clusters and the second plurality of isolated node clusters.

19. The processor-readable storage medium of claim 18, wherein generating the result set comprises:

selectively removing edges connecting a first portion of nodes of the second plurality of isolated node clusters and the set of coordinating nodes;

verifying the edges within the data access model exclude edges connecting the first portion of nodes of the second plurality of isolated node clusters; and generating the result set, responsive to the query, distributed across the first dataset and the second dataset.

20. The processor-readable storage medium of claim 19, comprising:
   identifying presentation of the result set to a computing device associated with the query; and
   based on presentation of the result set, reestablishing the edges connecting the first portion of nodes of the second plurality of isolated node clusters and the set of coordinating nodes.

21. The processor-readable storage medium of claim 19, wherein selectively removing the edges of the first portion of nodes comprises:
   identifying an access permission within the query, the access permission corresponding to nodes of the second plurality of node clusters available to the query;
   identifying the first portion of nodes is excluded from the access permission; and
   removing the edges of the first portion of nodes prior to execution of the query by the data access model.

* * * * *